Oct. 4, 1932.  H. VANDERPLOEG  1,880,606
HOOK FORMING TOOL
Filed July 18, 1929   2 Sheets-Sheet 1
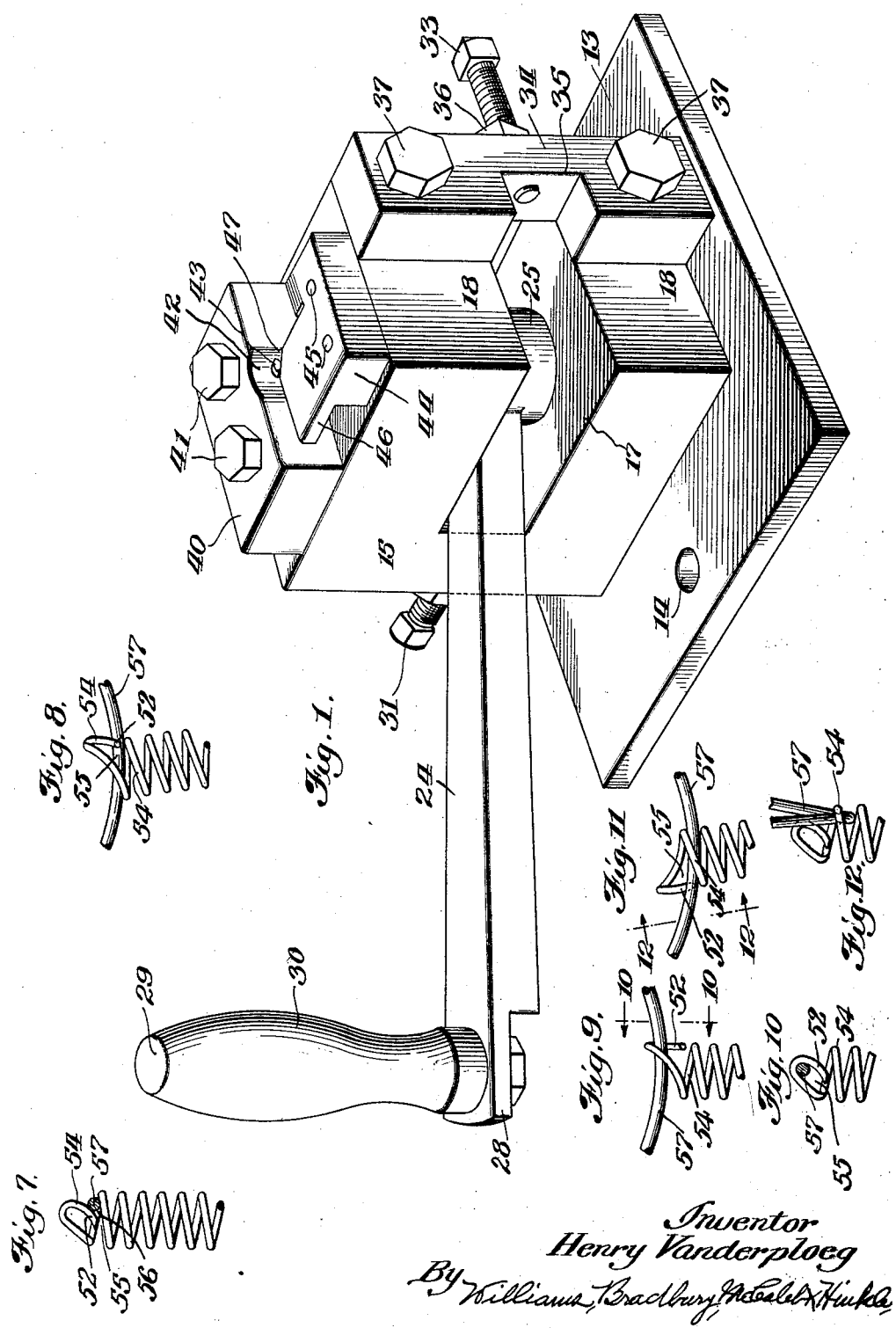
Inventor
Henry Vanderploeg
By Williams, Bradbury, McCaleb & Hinkle
Attys.

Oct. 4, 1932.  H. VANDERPLOEG  1,880,606
HOOK FORMING TOOL
Filed July 18, 1929  2 Sheets-Sheet 2
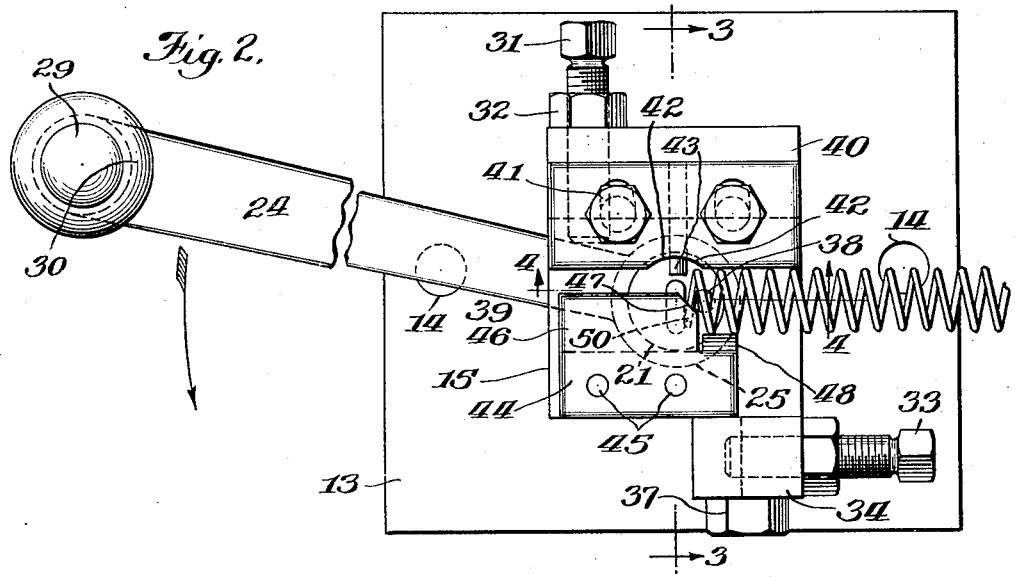
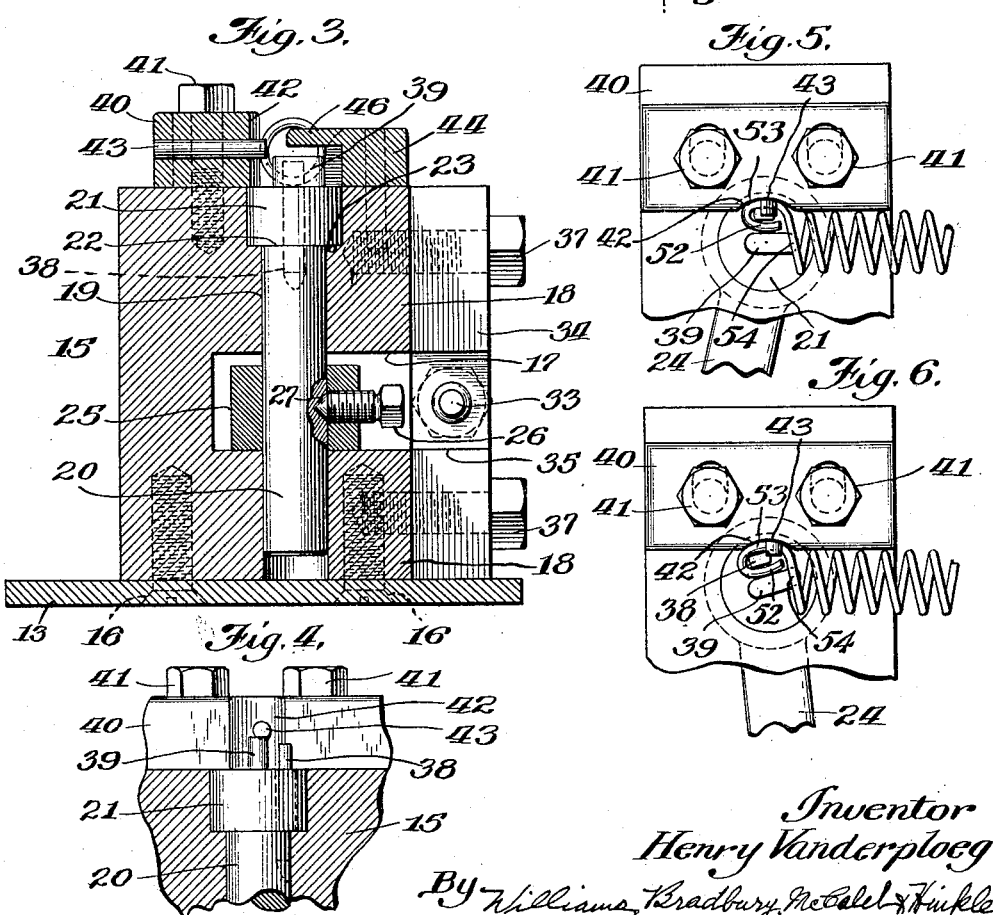
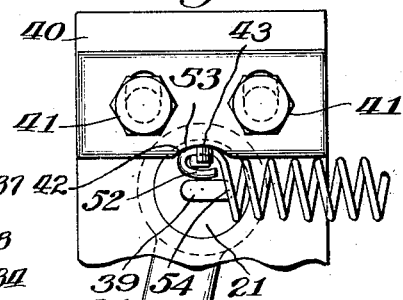
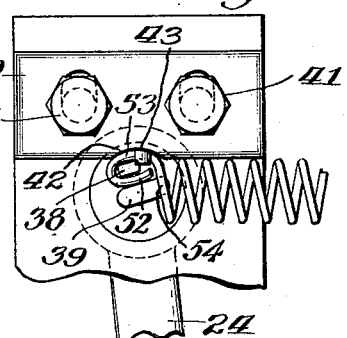
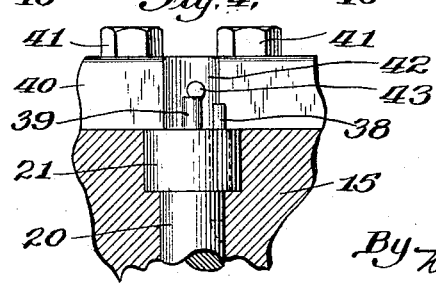
Inventor
Henry Vanderploeg
By Williams, Bradbury, McCaleb & Hinkle,
Attys.

Patented Oct. 4, 1932

1,880,606

UNITED STATES PATENT OFFICE

HENRY VANDERPLOEG, OF CHICAGO, ILLINOIS, ASSIGNOR TO HAGGARD & MARCUSSON COMPANY, OF CHICAGO, ILLINOIS, A CORPORATION OF ILLINOIS

HOOK FORMING TOOL

Application filed July 18, 1929. Serial No. 379,150.

My invention relates to hook forming tools.

More particularly it relates to a tool for forming hooks in the ends of so-called "helicals" employed to interconnect the top turns or convolutions of coil springs used in bed springs and upholstery.

It has long been the practice to interconnect the upper convolutions of the vertical bed and upholstery springs by means of relatively short and compactly coiled springs called helicals. They are usually arranged in pairs interlaced in cruciform relation and lying horizontally substantially in the plane of the upper convolutions of the bed or upholstery springs. The principal function of these helicals is to maintain the upper ends of the bed or upholstery springs in proper relation without detracting from the resiliency of the bed or cushion. Ordinarily the opposite ends of each helical are connected to the upper convolutions of two adjacent bed or upholstery springs and of course it is important that they do not accidentally become disconnected. Under the movements of the coil springs the helicals extend and contract and it was found long ago that ordinary hooks could not be depended upon to afford a reliable connection. In consequence it has been the practice to bend or crimp the ends of the helicals into a substantially closed hook or loop about the upper turns or convolutions of the vertical bed or upholstery springs during the assembly of the bed or cushion or to provide the ends of the helicals with preformed substantially closed hooks which were so formed that they could only be associated with the upper convolutions by applying each end of a helical just back of its hook and then, by turning the helical, thread the hook backwards into proper corelation with the upper convolution.

Both of these prior methods of assembling helicals to the bed or cushion coil springs are objectionable; the first because of the extra expense involved in forming the hooks about the convolutions at the time of assembling them together and the great liability of uncertain and improper connections, and the second because of the time required in and the difficulty of threading the helicals backwardly so as properly to bring the coil spring convolutions within the hooks.

One of the objects of my invention is to provide a tool for forming hooks in the ends of helicals, such hooks being capable of being snapped over the upper convolutions of the bed or upholstery springs and there effectively retained against accidental displacement.

Another object is to provide a tool which is efficient, effective, simple and reliable.

Other objects and advantages of my invention will hereinafter appear.

The specially hooked helicals and the method of making them are covered in my divisional copending application Serial No. 572,276, filed October 31, 1931.

In the accompanying drawings:

Fig. 1 is a perspective view of the tool or machine for making hooks in coil springs;

Fig. 2 is a plan view thereof;

Fig. 3 is a transverse vertical sectional view taken on the line 3—3 of Fig. 2;

Fig. 4 is a fragmentary sectional view taken on the line 4—4 of Fig. 2;

Fig. 5 is a fragmentary plan view showing another step in the formation of the hook;

Fig. 6 is a similar view showing the final step in the formation of the hook;

Fig. 7 is a view showing the manner of snapping a helical hook over the coil of a vertical coil spring;

Fig. 8 is a front elevation at right angles to Fig. 7;

Fig. 9 is a plan view showing the hook engaged with the coil;

Fig. 10 is a view taken on the line 10—10 of Fig. 9;

Fig. 11 is a plan view showing the initial step in disengaging the hook from the coil; and Fig. 12 is a view taken on the line 12—12 of Fig. 11.

Referring to the drawings in detail, there is shown an embodiment of a tool or machine for carrying out the method of making hooks in coil springs and while it will be described as being manually operated, it is to be understood that it may be operated by power and I do not desire to be restricted in this respect.

As illustrated, the device is shown as comprising or having a base 13 in the form of a plate equipped with openings 14 or other means for anchoring the device to a bench or other support. Arranged upon the base plate and constituting part of the frame is a block 15 shown secured in position by screws 16. This block is shown provided with a horizontal kerf or slot 17 extending from one side through the greater portion of its thickness, thus providing a bifurcated member having upper and lower jaws or furcations 18. These jaws are bored through vertically as indicated at 19 to take a vertical shaft 20 which has an enlargement or head 21 at the upper end thereof producing a shoulder 22 facing downwardly and resting upon a corresponding shoulder formed by an enlarged upper or countersunken portion 23 in the block, thus supporting the shaft against downward displacement while permitting it to freely rotate in its bearing. A handle 24 or other means for rotating the shaft may be provided and in the form shown the handle has a collar 25 fixed to the shaft as by means of a set screw 26 which may engage a seat 27 in the shaft to insure positive rotation thereof when the handle is swung in an arc. The handle may be considered a lever or other means which may be power operated for oscillating the shaft and is specifically shown provided at its free end with a reduced portion 28 adapted to take a bolt or spindle 29 on which is rotatably mounted a handle grip 30. However, the free end of the handle or lever is apertured and is thus adapted for connection with power means as a prime mover for oscillating the shaft in a manner to be hereinafter more fully described.

In order to gauge or limit the rotation of the shaft the block or anvil 15 at the back of the slot 17 is shown provided with an adjustable stop in the form of a set screw 31 passing through a threaded opening therein to be engaged by the lever 24 as more particularly shown in Fig. 2 of the drawings. This set screw may be held in adjusted position by a lock nut 32. In the other direction the lever is limited in its movement at the open end of the slot in an arc of slightly greater than 90 degrees by a set screw 33 which passes through the wall of a vertical support or block 34, having a confronting recess 35 at this point. The screw 33 is positioned at right angles to the screw 31 and is held in adjusted position by a lock nut 36. The supporting block 34 may be formed as a part of the block 15 or separate and in the illustration is disposed against the ends of the jaws or bearings 18 and anchored thereto by means of screws 37. It should also be noted that the recess 35 is in line with the slot 17 and the lever 24 travels through the slot 17 and into the recess 35 to be engaged by the set screw 33 which constitutes a stop limiting the movement of the lever in this direction. Of course, both set screws 31 and 33 may be adjusted, thus constituting adjustable stops or limiting means for determining and regulating the proper degree of throw of the lever or other operating means for the shaft.

The head 21 serves as an anvil and is flush with the top of the block 15, as more specifically seen in Fig. 3 of the drawings. This head is provided with a vertical flat sided pin 38 arranged off center and preferably substantially intermediately of the center or axis of the shaft and the periphery of the head 21, and has inner and outer sides flattened as shown. This pin sets in a vertical socket in the shaft. At the axis of the shaft parallel to the flattened sides of the pin 38 is an elongated stud or pin 39 which is likewise positioned in a socket in the shaft or formed thereon and arranged diametrically with its ends terminating in spaced relation to the periphery of the head 21.

A jaw block 40 is mounted transversely upon the top of the block 15 and held by suitable fastenings, such as screws 41, passing vertically into the block 15 or may be formed thereon. This jaw has a vertical curved recess 42 in its operative face concentric to the periphery of the shaft or head 21 thereof and preferably slightly overlying the latter. A horizontal forming pin 43 extends through the jaw 40 at right angles to its length and projects at its inner end from said operative face centrally of the recess 42 so as to lie in close proximity to the adjacent edge or end portion of the flat pin 39, considering the latter as elongated in plan.

Another jaw 44 is mounted upon the block 15 at its opposite side so as to oppose the jaw 40 and may be pinned vertically thereto as indicated at 45. This jaw has an overhanging portion 46 at the top, projecting over the elongated pin 39, which is bevelled, as indicated at 47, at its inner corner overlying the pin 39 so as to clear the pin 38 and beyond this overhanging portion. The jaw 44 is cut away or recessed to provide an inclined abutment face 48. The overhanging ledge 46 serves as a stop for determining the proper position of the free end of the helical inserted in the tool preparatory to the forming of the hook therein, as will be hereinafter described.

In operating the tool to form a hook in the end of a helical handle 24 is moved to a position against stop 31. In this position pin 39 lies substantially in line with pin 43 while pin 38 lies in front of pin 39, as most clearly shown in Fig. 2. One end of the helical is then inserted into the tool between jaws 40 and 44 with its end convolution, which is to be formed into a hook, seated between pins 38 and 39, as clearly shown in Fig. 2. The helical is then rotated on its axis in a clockwise direction until the end of the first convolution thereof strikes ledge 46 in order to insure that the proper length of wire is provided for the formation of the hook therein and that forming pins 38 and 39 engage the convolution in the proper region. Handle 24 is now rotated in the direction indicated by the arrow in Fig. 2. The resultant rotation of shaft 20 causes forming pins 38 and 39 to rotate in a counter-clockwise direction and since the terminal convolution of the helical is gripped therebetween, that convolution is bent about pin 38 in a plane substantially parallel to the axis of the helical to form the loop of the hook, as shown in Fig. 5. During this bending of the wire into a loop, stationary pin 43 serves as an abutment for preventing the pulling out of place of the second convolution (i. e., first undistorted convolution) of the helical and causes the wire of the first convolution to be bent thereabout in a direction axially of the helical, as shown most clearly in Fig. 6, to retain the plane of the loop of the hook substantially in line with the undistorted convolutions of the helical. The result of these two concurrent bending operations is that a hook-loop is formed from the wire of the end helical convolution and that loop is forced to lie substantially in line with the undistorted convolutions of the helical. When handle 24 has reached the limit of its movement against stop 33 the wire of the end convolution of the helical has been so bent that the nose 52 of the hook lies between shank 53 and the adjacent undistorted convolution 54 and substantially in line with and parallel to that adjacent convolution of the helical and separated therefrom a short distance. This distance should be sufficiently less than the diameter of the wire of which the bed spring coil is formed so that the wire of the coil cannot normally pass between the nose of the hook and the adjacent helical convolution. However, the throat 55 of the helical hook is considerably wider than the diameter of the wire of the bed spring coil so that such wire may be readily passed therethrough into the loop of the helical hook after it has once passed the nose 52.

By thus forming the hook so that the nose thereof lies in line with and parallel to the adjacent helical convolution, a wedge shaped passage 56 is formed by and between the nose of the hook and the adjacent helical convolution through which the larger wire of the bed spring coil may be readily forced in one direction to bring the bed spring wire to the throat of the hook, the bed spring coil temporarily forcing further apart the nose of the hook and the adjacent convolution of the helical. However, after the bed spring wire has passed beyond the nose of the hook, the nose and adjacent convolution of the helical spring back to normal separation, which is less than the diameter of the wire of the bed spring coil, and the bed spring will not readily pass in the reverse direction to permit the uncoupling of the helical coil from the bed spring coil.

In order to release the helical from the tool after the hook is formed therein, handle 24 is rotated back to normal against the stop 31, whereupon the helical is ejected or may be removed.

In applying the improved helical hook to the terminal coil 57 of a bed spring, the helical is positioned with the nose 52 of its hook against the proper coil 57 of the bed spring, as indicated in Figs. 7 and 8. By then applying pressure to the helical on the side opposite the nose of the hook, the coil 57 of the bed spring may be readily forced through the converging passage 56 between the nose 52 of the hook and the adjacent helical convolution 54 and the hook thus snapped over the bed spring coil. As soon as the bed spring coil has passed beyond the converging passageway between the nose 52 of the hook and the adjacent convolution 54, the nose and convolution spring back sufficiently close together effectively to block this passageway to prevent the bed spring coil from passing backwardly therethrough. After the bed spring coil has been forced beyond the nose of the hook in the helical it passes through the throat 55 of the hook into its final position in the loop thereof, as shown in Figs. 9 and 10. In this condition the helical and terminal coil of the bed spring cannot be disengaged by any of the usual movements therebetween resulting from use. However, should it ever become necessary to disconnect the helical from the bed spring this result can be easily effected by rotating the helical axially in a clockwise direction. Such rotation forces the bed spring coil into the passageway between the nose of the hook and the adjacent helical convolution in the same direction in which it was applied and the wire of the coil temporarily wedges apart the nose of the hook and the adjacent helical convolution so that it may pass therebetween and be disengaged from the coil, as clearly shown in Figs. 11 and 12.

Although the invention has been illustrated and explained as embodied in a tool particularly adapted for forming hooks in the ends of the bed spring helicals, it may be utilized in producing hooks in coiled springs adapted for other purposes.

Having thus illustrated and described the nature and one embodiment of my invention, what I claim and desire to secure by Letters Patent is as follows:

1. In a machine of the class described, a frame, an oscillatory part carried by the frame and adapted to receive the end of a helical spring thereover, two cooperating bending members on said oscillatory part, one of said bending members projecting beyond the other to engage the terminal of the end convolution of the spring for bending said terminal around the other member upon partial rotation of said oscillatory part, and a third bending member on said frame disposed to abut the end convolution of the spring to cause the hook to be bent off center with respect to the axis of the spring.

2. In a machine of the class described, a frame, an oscillatory part carried by the frame and adapted to receive the end of a helical spring thereover, two cooperating bending members on said oscillatory part, one of said bending members projecting beyond the other to engage the terminal of the end convolution of the spring, means for positioning and restraining displacement of the spring, a third bending member abutting said end convolution whereby upon partial rotation of the oscillatory part said end portion will be bent continuously to form a hook off center with respect to the axis of the spring, and means for actuating said oscillatory part.

3. In a machine of the class described, a frame, an oscillatory part carried by the frame and adapted to receive the end of a helical spring thereover, bending members on said oscillatory part, one of said bending members projecting beyond the other to engage the terminal of the end convolution of the spring, jaws on the frame receiving the spring therebetween, means on the frame to abut one end of the spring to cause the same to be bent in a plane traversing a coil upon rotation of the oscillatory part to bend a hook around one of said bending members with its nose forming a restricted passage with the adjacent convolution and a relatively unrestricted passage at the throat portion of the hook, means for actuating said oscillatory part, and means for limiting the movements of said oscillatory part.

4. In a machine of the class described, a frame, an oscillatory part carried by the frame and adapted to receive the end of a helical spring thereover, bending members on said oscillatory part, one of said bending members projecting beyond the other to engage the terminal of the end convolution of the spring, jaws on the frame receiving the spring therebetween, means on the frame to abut one end of the spring to cause the same to be bent in a plane traversing a coil upon rotation of the oscillatory part to bend a hook around one of said bending members with its nose forming a restricted passage with the adjacent convolution and a relatively unrestricted passage at the throat portion of the hook, means for actuating said oscillatory part, and means carried by the frame for limiting the throw of said actuating means, said hook thus formed being adapted to be released by reverse movement of the actuating means and oscillatory part after the hook is formed.

5. In a tool for forming hooks in the ends of helical coil springs, a base, an anvil thereon, a shaft rotatably mounted in the anvil and having means for actuating the same, said shaft having an enlargement flush with the top of the anvil, bending pins on said enlargement and projecting upwardly therefrom in spaced relation, one of said pins extending across the axis and being elongated beyond the other pin, said pins being positioned to receive the terminal of the spring therebetween, jaws on the anvil, one of which is engaged by the terminal of the spring positioned between said pins and said jaws adapted to receive the spring therebetween for positioning the same, one jaw having an arcuate recess and a stop member to engage a portion of the end coil of the spring to restrain the same against movement and cause bending of the hook when the shaft is rotated to dispose the hook off center with respect to the spring, and means for oscillating the shaft in an arc of substantially 90 degrees.

6. In a machine of the class described, a frame, an oscillatory part carried by the frame and adapted to receive an end of the helical spring thereover, two bending members on said oscillatory part, one of said bending members projecting beyond the other to engage the terminal of the end convolution of the spring to bend a hook around the other said bending member, and a third bending member on said frame disposed to abut one end of the spring, to cause the same to bend in a plane traversing the coil upon rotation of said oscillatory part.

7. A tool for forming a hook of the end convolution of a helical coil, comprising a rotary head, a pair of forming members projecting from the face of the head, said members being spaced apart to receive between them a convolution of a helical coil and when the head is turned to bend the coil into a hook about one of the members, and a stationary member projecting into the path of the coil to engage the end convolution thereof to the side of the forming members and assist the forming members to turn the hook axially of the coil.

8. A tool for forming a hook of the end convolution of a helical coil, comprising a rotary head, a pair of forming members carried by the head and spaced apart to receive between them the wire of the end convolution of a helical coil, a stop for the tip of the end convolution to gage the region of the convolution lying between the forming members, a stationary abutment projection into the path of the end convolution, and means for turning the head to bend the end convolution about one of the movable forming members and the stationary abutment to form a hook in the coil which lies substantially parallel to the axis of the coil with its tip parallel to the adjacent undistorted convolution.

9. A tool for forming a hook of the end convolution of a helical coil, comprising a pair of forming members spaced apart to receive the wire of the end convolution of a coil and rotatable about a common axis to form such wire in a partial loop about one of the members, a stationary abutment projecting into the path of the coil to engage the end convolution thereof at one side of the forming members, and means to rotate the forming members on the common axis to cause the same to bend the end convolution into the loop about one of the members, the abutment serving to retain the convolution in proper position between the forming members and cooperating therewith to dispose the loop substantially in line with the undistorted convolutions of the coil.

In witness whereof, I hereunto subscribe my name this 15th day of July, 1929.

HENRY VANDERPLOEG.